(12) United States Patent
Chaney

(10) Patent No.: US 10,802,174 B2
(45) Date of Patent: Oct. 13, 2020

(54) APPARATUSES AND METHODS FOR DETERMINING PROPERTIES OF SUBTERRANEAN LAYERS

(71) Applicant: Reeves Wireline Technologies Limited, Leicestershire (GB)

(72) Inventor: Darren Chaney, Leicestershire (GB)

(73) Assignee: Reeves Wireline Technologies Limited, Leicestershire (GB)

(*) Notice: Subject to any disclaimer, the term of this patent is extended or adjusted under 35 U.S.C. 154(b) by 118 days.

(21) Appl. No.: 16/220,266

(22) Filed: Dec. 14, 2018

(65) Prior Publication Data
US 2019/0196047 A1    Jun. 27, 2019

(51) Int. Cl.
    *G01V 3/20*        (2006.01)
    *G01V 3/38*        (2006.01)
    (Continued)

(52) U.S. Cl.
    CPC ............. *G01V 3/20* (2013.01); *G01V 3/30* (2013.01); *G01V 3/38* (2013.01); *G01V 3/28* (2013.01)

(58) Field of Classification Search
    CPC . G01V 3/00; G01V 3/08; G01V 3/081; G01V 3/082; G01V 3/18; G01V 3/20;
    (Continued)

(56) References Cited

U.S. PATENT DOCUMENTS

| 4,300,098 A | 11/1981 | Huchital et al. |
| 5,345,179 A | 9/1994 | Habashy et al. |

(Continued)

FOREIGN PATENT DOCUMENTS

| EP | 2110688 A1 | 10/2009 |
| GB | 2407641 A  | 5/2005  |

(Continued)

OTHER PUBLICATIONS

UK Search Report received in copending UK Application No. GB1721472.7 dated Jun. 20, 2018, 1 page.

(Continued)

*Primary Examiner* — Hoai-An D. Nguyen
(74) *Attorney, Agent, or Firm* — Blank Rome, LLP

(57) ABSTRACT

Apparatus (10) for use in determining values of properties of n layers (16,17) of a borehole (11) formed in the Earth's crust (12) comprises a plurality of at least (2n-1) sensor members (19,21,22) of mutually differing, known or calculable, geometric factors, as defined with reference to a sample under investigation comprising n layers. The sensor members (19,21,22) are capable of detecting reflected or transmitted electromagnetic energy and the apparatus (10) includes one or more supports (24,26') for supporting the sensor members (19,21,22) in a said borehole (11) adjacent and/or in contact with one or more said layers (16,17), the apparatus (10) being capable of causing transmission of electromagnetic energy along, and/or reflection of electromagnetic energy at, each sensor member (19,21,22) in a manner permitting the calculation of values of properties of such layers (16,17) based on reflected or transmitted energy values detected at the sensor members (19,21,22).

36 Claims, 6 Drawing Sheets

(51) Int. Cl.
*G01V 3/30* (2006.01)
*G01V 3/28* (2006.01)

(58) Field of Classification Search
CPC ... G01V 3/26; G01V 3/28; G01V 3/30; G01V 3/38; G01R 27/00; G01R 27/06; G01R 27/28; G01R 31/00; G01R 31/08; G01R 31/01; G01R 31/11; G01R 31/28; G01N 22/00; G01N 33/00; G01N 33/0004; G01N 33/0009; G01N 33/0027; G01N 33/0031

USPC ....... 324/323, 333, 334, 338, 345, 346, 347, 324/348, 351, 354, 355, 357, 358, 366, 324/368, 500, 512, 527, 532, 533, 534, 324/600, 629, 637, 638, 639, 642, 646
See application file for complete search history.

(56) References Cited

U.S. PATENT DOCUMENTS

| | | | | |
|---|---|---|---|---|
| 5,892,361 A * | 4/1999 | Meyer, Jr. | ................ | G01V 3/30 |
| | | | | 324/338 |
| 8,957,683 B2 * | 2/2015 | Bittar | ...................... | G01V 3/30 |
| | | | | 324/339 |
| 9,217,809 B2 * | 12/2015 | Simon | ...................... | G01V 3/30 |
| 10,545,256 B2 * | 1/2020 | Chaney | .................... | G01V 3/02 |
| 2013/0257435 A1 * | 10/2013 | Smithson | ................ | E21B 47/06 |
| | | | | 324/338 |
| 2014/0375320 A1 * | 12/2014 | Liu | ........................ | G01V 3/38 |
| | | | | 324/324 |
| 2017/0108608 A1 * | 4/2017 | Chaney | .................... | G01V 3/20 |

FOREIGN PATENT DOCUMENTS

| | | |
|---|---|---|
| GB | 2543356 A | 4/2017 |
| WO | 2010059275 A1 | 5/2010 |

OTHER PUBLICATIONS

UK Examination Report received in copending UK Application No. GB1721472.7 dated Nov. 4, 2019, 4 pages.

* cited by examiner

APPARATUSES AND METHODS FOR DETERMINING PROPERTIES OF SUBTERRANEAN LAYERS

FIELD OF THE DISCLOSURE

The disclosure relates to apparatuses and methods for determining properties of subterranean layers. Such apparatuses and methods are useful in the logging of subterranean features.

Logging techniques are used extensively in the mining and oil/gas industries to help locate formations containing various substances and also when prospecting for e.g. underground water or when assessing features that may affect the stability, strength, hardness, porosity or other parameters of rock e.g. when preparing to recover hydrocarbons, water and minerals or when preparing for tunneling or construction work. The subject matter of the present disclosure is of utility in all such endeavors.

BACKGROUND OF THE DISCLOSURE

As is well known, prospecting for minerals of commercial or other value (including but not limited to hydrocarbons in liquid or gaseous form; water e.g. in aquifers; and various solids used e.g. as fuels, ores or in manufacturing) and assessing rock properties as outlined are economically and technically important and challenging activities. For various reasons those wishing to extract minerals and other substances as aforesaid from below the surface of the ground or beneath the floor of an ocean need to acquire as much information as possible about both the potential commercial worth of the minerals in a geological formation and also any difficulties that may arise in the extraction of the minerals to surface locations at which they may be used. Similarly, those wishing to assess the strength, stability, etc. of rock have comparable information needs.

For these and related reasons over many decades techniques of logging of subterranean formations have developed for the purpose of establishing, with as much accuracy as possible, information about subterranean conditions. Logging also is used for other purposes as summarized above.

Many types of logging involve the insertion of a logging tool including a section sometimes called a "sonde" into a borehole or other feature penetrating a rock formation under investigation. The sonde is capable of emitting energy that passes into, and hence energizes in some way, the rock. The logging tool or another tool associated with it includes, usually spaced and energetically isolated from any part of the sonde that emits energy, one or more detectors or receivers (these terms being essentially synonymous) of such energy that has passed through the various components in the rock before being recorded by the logging tool or a processing device associated with the logging tool. The information recorded in this way usually is based on activation of the detector(s) to produce electrical signals indicative of the received energy.

One characteristic of formations surrounding boreholes that is of potential interest to petrophysicists and others charged with the task of assessing downhole environments (the terms "uphole" and "downhole" being familiar to those of skill in the art) is the relative permittivity or dielectric constant of the rock formation.

One reason this quantity is of interest is that its value is distinctive depending on the fluid contained in pores in the rock. This is of potential benefit in determining whether the rock pores contain water, oil, gas or a mixture of these fluids.

In particular, it is known that the dielectric constant of liquid hydrocarbons, especially oil, is in the approximate range 1-3; that of rock is in the approximate range 4-10; and that of water is in the approximate range 56-80. An accurate measure of dielectric constant can provide a direct indication of the make-up of fluids (including fluid mixtures) in the rock pores. Different mixtures of fluids can influence the dielectric constant to a variable extent; and the measured value also may be influenced by the rock type.

This is an advantage of a dielectric constant measurement over for example a resistivity measurement that, while widely used in logging technologies, can be ambiguous when seeking to distinguish between rock-borne water and rock-borne hydrocarbons. This is particularly the case when the water in the formation is of low or zero salinity, the problems of resistivity measurement ambiguity tending to diminish with increasing salinity of any water in the pores of the rock.

Energy emission techniques as outlined above have been used in the prior art for the purpose of establishing the dielectric constant or permittivity of rock surrounding a borehole. However, such techniques hitherto have not proved popular among logging engineers and analysts. This is believed to be because emitted energy signals from which it is suitable to derive permittivity values tend not to travel far into the rock surrounding a borehole as they pass from transmitter to receiver elements forming part of a logging tool. As a result, the signals generated by emitter-receiver logging tools intended to measure permittivity tend to contain little information about the geology, etc., of the rock.

In consequence many rock permittivity measuring devices are only used in laboratory environments to which rock samples are conveyed after their removal from a borehole. This for various reasons is sub-optimal.

Even in prior art permittivity-measuring logging tools that can be used in downhole environments the useful information in the signals often is dominated by noise, unwanted harmonics of desired signals, the effects of direct transmission paths not passing through the rock, reflections and so on. In this regard the receiver elements normally are antennae that are tuned to resonate at frequencies typical of the transmitted energy and therefore are prone to the indicated drawbacks. Such problems are generally familiar to those of skill in the logging art, and do not require describing in detail herein.

Patent application no GB 1518353.6, the disclosure of which is incorporated herein by reference in its entirety, describes apparatuses and methods, for establishing formation permittivity values that address problems of the kind summarized above. GB 1518353.6 discloses various apparatuses for evaluating changes in microwave electromagnetic energy signals due to interactions of the fringing field that occurs at the surface of the sensor and e.g. the wall of a borehole or the surface of mud cake formed on the interior of a borehole. The energy detected and measured by the apparatuses of GB 1518353.6 allows the derivation of permittivity information at a considerable depth into the rock without having to establish an energy transmission path, between an emitter and a receiver, taking in all the rock of interest.

One form of apparatus disclosed in GB 1518353.6 may operate in a transmission mode in which signals are transmitted along a coplanar waveguide where they are partially guided by the formation. Such apparatus also may be operated in a reflection mode.

In all cases the apparatus of GB 1518353.6 is capable of generating outputs that are indicative of the permittivity of rock at a considerable depth of penetration from the logging tool, without a requirement to pass energy through the rock to detectors spaced from emitter devices as are used in other logging tool types.

In use of most known designs of logging tool the tool is conveyed to a particular depth along the borehole, which may be at or near its "total depth" (i.e. the furthest downhole extremity along the borehole from the surface location at which the borehole terminates at its uphole end) but this need not be so and the logging tool can be usefully conveyed to in practice any depth along the borehole as desired. The tool in use is drawn from such a downhole location towards the surface termination of the borehole. The logging tool records log data at a series of logging depths on its travel along the borehole. Depending on the exact style of logging under consideration, logging may take place either when the logging tool is moving in a downhole direction, or when it is moving in an uphole direction. The subject matter of the present disclosure as defined herein is not limited to any particular direction of movement or mode of conveyance of the logging tool.

As used herein "logging depth" refers to the location along the borehole, measured from the uphole end, at which a particular logging activity takes place. Most logging tools (or apparatuses associated with them) are able to record or indicate the depth along the borehole at which each logging action occurs, and this information is included in data logs/log signals when these are created, recorded, stored, processed, displayed, printed or plotted for viewing. A logging tool may detect and record many hundreds or thousands of data sets during its travel along the borehole and usually it is important to identify the location in the borehole at which each batch of data is acquired.

Although extensive reference is made herein to "depth" as a measure of distance along a borehole, it should be understood that boreholes drilled or otherwise formed in rock for purposes such as logging, mineral recovery, water recovery, hydrocarbon recovery and various civil engineering activities do not necessarily extend entirely or even (in some cases) appreciably vertically. Thus, the terms "logging depth" and derivatives include measures of distance along a borehole, in general.

Terms such as "depth of penetration", "depth of investigation" and derivatives, in contrast, refer to the distance from a borehole into the rock over which a particular log contains useful information about the rock. Thus, in the case of an energy-emitting logging tool having spaced receivers for receiving transmitted energy, the depth of penetration is a measure of the extent to which the emitted energy spreads into the rock before returning to the receiver section of the logging tool. In the case of the apparatus of GB 1518353.6 the depth of investigation is a measure of the distance into the rock over which the detected energy signals indicate characteristics, such as the permittivity or dielectric constant, of the rock.

The apparatuses and methods of GB 1518353.6 represent considerable advances in the field of logging to establish useful permittivity measurements. The inventor however has realized that further improvements are possible in apparatuses and processes for establishing characteristics of rock.

SUMMARY OF THE DISCLOSURE

Disclosed herein in a first aspect is apparatus for use in determining values of properties of n layers of a borehole formed in the Earth's crust, the apparatus comprising a plurality of at least (2n-1) sensor members of mutually differing, known or calculable, geometric factors, as defined with reference to a sample under investigation comprising n layers, the sensor members being capable of detecting reflected or transmitted electromagnetic energy and the apparatus including one or more supports for supporting the sensor members in a said borehole adjacent and/or in contact with one or more said layers, the apparatus being capable of causing transmission of electromagnetic energy along, and/or reflection of electromagnetic energy at, each sensor member in a manner permitting the calculation of values of properties of such layers based on reflected or transmitted energy values detected at the sensor members.

Such apparatus advantageously permits the determination of plural properties of rock surrounding a borehole and/or (as desired) layers such as mud cake inside the borehole. Embodiments described herein are capable of generating log signals (i.e. electrical signals) indicative of the thickness of a layer of mud cake formed in a borehole, the dielectric constant of the mud cake and the dielectric constant of rock through which the borehole passes; but in alternative embodiments other combinations of properties may be determined using apparatus in accordance with the present disclosure. The inventor has found that using the apparatus of the present disclosure such properties as mentioned can be accurately determined in the case of mud cake thicknesses of up to 20 mm. It is believed that the apparatus also may be successfully operated accurately to determine the properties of the rock when greater mud cake thicknesses are encountered.

Mud cake is familiar to those having knowledge of drilling and logging techniques. The formation of a layer of mud cake on the inner wall of a borehole as explained in GB 1518353.6 can render inaccurate any attempts at measuring the dielectric constant of rock surrounding the borehole using prior art devices. Apparatus such as that of embodiments that permits the ready determination of the mud cake thickness, the mud cake dielectric constant and the dielectric constant of the rock, is expected to be of very great utility in generating permittivity values that are independent of the effects of mud cake.

Clearly the value of n, being the number of layers of a system, especially a borehole system as explained herein, with reference to which the number (2n-1) of sensors is defined, as a practical matter will be an integer number. However, it is possible to devise workable apparatus within the scope of the disclosure in which more than (2n-1) sensors are used to determine the relative permittivity in a system comprising n layers. For this reason, it is possible for the apparatus to include (2n-1) sensors, or more than (2n-1) sensors as indicated above.

Optional features of the first aspect of apparatus described herein are as follows.

The apparatus can include three of the sensor members.

A first of the sensor members can include a first open-ended coaxial reflectometer sensor.

A first of the sensor members can include a first open-ended coaxial reflectometer sensor, and a second of the sensor members can comprise a second open-ended coaxial reflectometer sensor.

A first of the sensor members can include a first open-ended coaxial reflectometer sensor; a second of the sensor members comprises a second open-ended coaxial reflectometer sensor; and the second open-ended coaxial reflectometer sensor is larger than the first open-ended coaxial reflectometer sensor, whereby the size of a fringing field of the second open-ended coaxial reflectometer gives rise to investigation more deeply into a material adjacent to the apparatus than the first open-ended coaxial reflectometer sensor.

A third of the sensor members can include a coplanar waveguide sensor.

A third of the sensor members can include a coplanar waveguide sensor, and the coplanar waveguide sensor and/or each open-ended coaxial reflectometer sensor can include an elongate pad member, wherein a transverse cross-section of the elongate pad member is or includes an ellipse or a part-elliptical shape.

The apparatus can include three of the sensor members, wherein a first of the sensor members comprises a first open-ended coaxial reflectometer sensor, and wherein the apparatus further can comprise two coplanar waveguide sensors and one open-ended coaxial reflectometer sensor.

The apparatus can include three coaxial reflectometer sensors.

The apparatus can include one or more sources of electromagnetic energy operatively connectable electrically to energize the sensor members in radio or microwave frequencies in order to give rise to detectable energy detected at the sensor members.

The apparatus can include one or more analyzers of detected energy connected to detect values of energy at each of the sensor members.

The apparatus can include one or more analyzers of detected energy connected to detect values of energy at each of the sensor members; and one or more processing devices configured to derive one or more values of properties of material that is in use adjacent the apparatus, the one or more processing devices being operatively connectable to the one or more analyzers.

Each of the sensor members can include a sensor surface or a sensor plane.

Each of the sensor members can include a sensor surface or a sensor plane, and the one or more supports can comprise a sensor pad defining a pad surface, each of the sensor members being supported in or by the sensor pad in a manner causing the sensor surface or sensor plane to be at least substantially coterminous with an exterior side of the pad surface.

The apparatus can be constituted as or form part of an elongate, cylindrical logging tool, where the sensor members are supported spaced from one another along a line extending along a part of the logging tool.

The apparatus can include one or more analyzers of detected energy connected to detect values of energy at each of the sensor members; one or more processing devices configured to derive one or more values of properties of material that is in use adjacent the apparatus, the one or more processing devices being operatively connectable to the one or more analyzers; and one or more memory devices operatively connected to at least one of the processing devices for storing values of properties calculated by the processing device and/or values of reflected energy detected by the one or more analyzers.

The apparatus can include an elongate, cylindrical logging tool, the sensor members being supported spaced from one another along a line extending along a part of the logging tool, the logging tool being operatively connectable to wireline in order to permit telemetry of values of properties calculated by the processing device and/or values of reflected energy detected by the one or more analyzers from the apparatus to a location remote from the apparatus.

The apparatus can include one or more processing devices configured to derive one or more values of properties of material that is in use adjacent the apparatus, the one or more processing devices being operatively connectable to the one or more analyzers; an elongate, cylindrical logging tool, the sensor members being supported spaced from one another along a line extending along a part of the logging tool; and one or more display devices, printers or plotters operatively connected to one or more said processing device, the one or more processing device and the one or more display devices, printers or plotters being configured to provide a visual indication of values of properties of the n layers.

A second aspect disclosed herein includes an apparatus for determining a parameter of a borehole system, the apparatus comprising two sensors that are capable of generating output signals indicative respectively of differing mixtures of values of a first parameter of the borehole system and a further parameter of the borehole system, the first parameter being representative of a single physical characteristic of the borehole system and the further parameter taking account of up to two further physical characteristics of the borehole system, the sensors being operatively connected to processing apparatus that converts the signals output by the sensors to a value of the first parameter that is compensated for the further parameter.

Such apparatus advantageously may be used to generate seed values for a minimization method that is useful in determining the desired properties of n layers of a borehole system.

Such apparatus also may be used directly to determine one or more parameters of e.g. a borehole system in which it is used. Methods by which such results may be achieved are described herein.

This apparatus may in practice be embodied similarly to the apparatus of the first aspect but this need not necessarily be the case.

According to a third aspect there is provided apparatus for determining a parameter of a borehole system, the apparatus comprising three sensors of electromagnetic energy that are capable of generating output signals indicative of differing mixtures of values of a first parameter of the borehole system, a second parameter of the borehole system and a third parameter, wherein the processing apparatus is programmable and is programmed to perform a method comprising the steps of converting the signals output by the sensors by:

a. fitting the sensor geometric factors with a suitable mathematical function;

b. using the equation $\varepsilon_a = q_m \varepsilon_m + q_r \varepsilon_r + q_t \varepsilon_t$, the equation $q_t + q_m + q_r = 1$ and the function from Step a. to solve for the third parameter; and c. equating the resulting expression for two different sensors thereby eliminating the third parameter from Step b. and giving an expression that has input from two sensors with two unknowns from which the value of the first parameter is derivable.

Optional features of the second aspect are as follows.

The processing apparatus can be programmed such that the step b. of fitting the sensor geometric factor with the suitable mathematical function comprises fitting the sensor geometric factor with a function of the form $q_m = a[1-\exp(-br)]$ (Equation 2).

The processing apparatus can be programmed such that the step b. of fitting the sensor geometric factor with the suitable mathematical function comprises fitting the sensor geometric factor with a function of the form $q_m = a[1-\exp(-br)]$ (Equation 2) and wherein the processing apparatus is programmed to effect the step of Taylor series expanding of Equation 2.

The processing apparatus can analyze the sensor outputs in accordance with the expression $$\varepsilon_r \approx \frac{a_2 b_2 \varepsilon_{a1}(q_{t1}-1) - a_1 b_1 \varepsilon_{a2}(q_{t2}-1)}{a_1 b_2 a(q_{t2}-1) - a_2 b_2(q_{t1}-1)},$$

wherein $\varepsilon_r$ is the first parameter compensated for the further parameter; whereby the apparatus in use generates as an output a signal that is indicative of the first parameter.

Further embodiments disclosed herein include a borehole system including a borehole penetrating the Earth's crust and having received therein apparatus according to any of the embodiments disclosed herein, the apparatus being operatively positioned to detect energy reflected at the sensor members of the apparatus.

When the apparatus is in accordance with the first aspect described herein the borehole defines n layers. Preferably in such a system n=2. In other preferred embodiments n may adopt other integer values that are greater than 1, although in practice n is unlikely to exceed 3.

According to a fourth aspect there is provided a method of determining values of one or more properties of n layers of a borehole formed in the Earth's crust, the method comprising supporting in a said borehole adjacent one or more said layers a plurality of at least (2n-1) sensor members of mutually differing, known or calculable, geometric factors as defined with reference to a system, especially a borehole system as defined herein, comprising n layers; causing transmission of electromagnetic energy along, and/or reflection of electromagnetic energy at, each sensor member the sensor members being capable of detecting such transmitted and/or reflected electromagnetic energy, the method including calculating values of properties of such layers based on such energy values detected at each sensor member.

A fifth aspect disclosed herein is a method of determining the value of a parameter of a borehole system comprising a borehole having supported therein apparatus comprising two sensors that are capable of generating outputs indicative respectively of differing mixtures of values of a first parameter of the borehole system and a further parameter of the borehole system, the first parameter being representative of a single physical characteristic of the borehole system and the further parameter taking account of up to two further physical characteristics of the borehole system, the method including causing transmission of electromagnetic energy along, and/or reflection of electromagnetic energy at, each sensor member the sensor members being capable of detecting such transmitted and/or reflected electromagnetic energy; and the method further including operatively connecting the sensors to processing apparatus, and using the processing apparatus to convert the sensor outputs to a value of the first parameter that is compensated for the further parameter.

According to a sixth aspect there is provided a method of determining a parameter of a borehole system, the method comprising using apparatus comprising three sensors of electromagnetic energy to generate output signals indicative respectively of differing mixtures of values of a first parameter of the borehole system, a second parameter of the borehole system and a third parameter, wherein the processing apparatus is programmable and is programmed to perform a method comprising the steps of converting the signals output by the sensors by:

a. fitting the sensor geometric factors with a suitable mathematical function;
b. using the equation $\varepsilon_a = q_m \varepsilon_m + q_r \varepsilon_r + q_t \varepsilon_t$, the equation $q_r + q_m + q_t = 1$ and the function from Step a. to solve for the third parameter; and
c. equating the resulting expression for two different sensors thereby eliminating the third parameter from Step b. and giving an expression that has input from two sensors with two unknowns from which the value of the first parameter is derivable.

Thus, there are provided at least two viable approaches to situations in which the problem requiring analysis is underdetermined, i.e. there are more unknowns than sensor channels or signals.

Advantages of the methods defined herein are analogous to those of the apparatus defined elsewhere herein. The method may be put into effect using apparatus as described herein, and in a borehole system as described herein.

Methods of creating a log, plot, array or database of one or more values of at least one property of the n layers generated through carrying out of the method of the fourth aspect of the present disclosure and/or of creating a log, plot, array or database of one or more values of the first parameter generated through carrying out the method of the fifth or sixth aspect also lie within the scope of the disclosed subject matter.

Similarly, the subject matter of the present disclosure includes storing, transmitting, displaying or processing one or more values of one or more properties of layers or parameters that result from carrying out the methods of the fourth or fifth aspects.

The subject matter of the present disclosure further is considered to reside in a non-transitory computer-readable storage medium storing computer-readable instructions for causing a processing device to carry out steps of a method according to any of embodiments disclosed herein.

For the avoidance of doubt also disclosed herein is a method including effecting deployment of apparatus according to any of the embodiments disclosed herein in a borehole having n layers and operating the apparatus to derive values of properties of the n layers; and a method including effecting deployment of apparatus according to any of the embodiments disclosed herein in a borehole and operating the apparatus to derive one or more values of at least the first parameter. In either case the method optionally may include, and typically will include, withdrawing the apparatus along the borehole. Such methods include the generation of signals, especially electrical signals and their transmission and processing as explained herein.

The deriving (as appropriate) of values of properties of layers surrounding the apparatus or of parameter values may take place e.g. during deployment as aforesaid and/or during withdrawal of the apparatus.

The methods and uses of the apparatuses, borehole systems and non-transitory computer-readable medium in embodiments involve or make use of transformations of transmitted and/or reflected electromagnetic energy to particular forms of electrical or electronic signal, having the characteristics specified herein. Such signals may be processed in a variety of ways and following or as part of practicing of the methods of the present disclosure may be used e.g. to control the appearance of pixels of a display screen or the activity of a printer or plotter.

The signals following processing in accordance with the present disclosure also may be used to control the status of a memory device for the purpose of storing data related to the signals. Yet a further use of such signals is in the generation of commands that may be transmitted to other apparatuses (such as but not limited to drilling equipment, other logging devices and devices intended to perform specific functions in downhole environments) for the purpose of controlling them.

It is also known in the data logging art to generate signals that are indicative of measured and/or calculated quantities in other ways. To the extent that such alternative signal types are compatible with the method and apparatuses of the present disclosure, the disclosed subject matter as defined herein extends to such embodiments.

When the signals are embodied as electrical or electronic signals optionally the methods of the present disclosure respectively include the step of processing the electrical or electronic signals using a processor forming part of a logging tool. Such logging tool designs are known per se and typically include programmable elements that can be programmed to carry out the relevant steps of the method of the present disclosure on signals generated in the logging tool.

Additionally or alternatively, however, the methods of the present disclosure may respectively include the step of processing the electrical or electronic signals using a remote processor that is spaced from the logging tool. In such a case the signals may be telemetered (or otherwise transmitted or conveyed) from a logging tool to the remote processor essentially in real time, for example using a technique such as wireline transmission or coded mud pulse generation; or the logging tool may be of a type that includes an on-board memory. The latter may record the signals, or analogues of them, for downloading to the remote processor after the logging tool has been recovered to a surface location e.g. at the end of a logging operation.

Moreover, it is not essential that processing of the signals takes place using programmable devices or elements. Non-programmable processing means, including but not limited to hard-wired electrical and/or electronic circuits, are also possible and are disclosed hereby for such purposes.

The signals generated using the apparatuses and/or in accordance with the methods described herein may be considered as logs, or as parts of logs. The signals may be analyzed as voltages, currents, frequencies or derivatives of such quantities. The signals may in certain embodiments be capable of representation as complex numbers. The disclosure extends to logs as generated using the apparatuses described herein and/or by way of methods described herein.

More generally the disclosed embodiments are expected to be useful for all open hole data gathering techniques, including but not limited to wireline, logging while drilling (LWD) and memory-based data capture.

Further, the described apparatuses are capable of, and the described methods include, causing transmission of electromagnetic energy along, and/or reflection of electromagnetic energy at, each sensor member in a plurality of frequencies.

This is a significant advantage of embodiments described herein over the prior art: the described embodiments are capable of performing sweeps consisting of any number (hundreds if needs be) of discrete frequencies. This is a major benefit over the prior art in which at best only 4 or 5 frequency variation sweeps are possible.

Plotting of dielectric constant values derived using the apparatuses and/or the methods described herein against frequency gives rise to what is known in the art as a dielectric frequency dispersion curve. This curve has several advantageous potential uses.

1) It is possible to extrapolate the curve down to zero frequency to give what is known in the art as a static dielectric constant.

2) It is possible to fit the curve with a standard dielectric model, such as a Debye relaxation model (by way of non-limiting example).

3) It is possible to separate the fluid dielectric components from the rock dielectric components. Advantage 3) permits:

4) Matching of the shape of the dispersion curve to known rock or clay types better to evaluate the rock properties.

Additional embodiments of the present disclosure can be characterized as follows.

In a first embodiment, an apparatus for determining a parameter of a borehole system, the apparatus comprising:
two sensors configured to output signals indicative respectively of differing mixtures of values of a first parameter of the borehole system and a second parameter of the borehole system, the first parameter being representative of a single physical characteristic of the borehole system, the second parameter taking account of up to two further physical characteristics of the borehole system; and
a processing apparatus, the sensors being operatively connected to the processing apparatus, the processing apparatus converting the signals output by the sensors to a value of the first parameter that is compensated for the second parameter.

In a second embodiment, an apparatus for determining a parameter of a borehole system, the apparatus comprising:
three sensors of electromagnetic energy configured to generate output signals indicative of differing mixtures of values of a first parameter of the borehole system, a second parameter of the borehole system and a third parameter; and
a processing apparatus programmed to perform a method comprising the steps of converting the signals output by the sensors by:
a. fitting the sensor geometric factors with a suitable mathematical function;
b. using the equation $\varepsilon_a = q_m \varepsilon_m + q_r \varepsilon_r + q_t \varepsilon_t$, the equation $q_t + q_m + q_r = 1$ and the function from Step a. to solve for the third parameter; and
c. equating the resulting expression for two different sensors thereby eliminating the third parameter from Step b. and giving an expression that has input from two sensors with two unknowns from which the value of the first parameter is derivable.

The apparatus according to the second embodiment, wherein the processing apparatus is programmed such that the step b. of fitting the sensor geometric factor with the suitable mathematical function includes fitting the sensor geometric factor with a function of the form $q_m = a[1 - \exp(-br)]$ (Equation 2).

The apparatus according to the second embodiment, wherein the processing apparatus is programmed such that the step b. of fitting the sensor geometric factor with the suitable mathematical function includes fitting the sensor geometric factor with a function of the form $q_m = a[1 - \exp(-br)]$ (Equation 2) and wherein the processing apparatus is programmed to effect the step of Taylor series expanding of Equation 2.

The apparatus according to the first embodiment, wherein the processing apparatus analyses the sensor outputs in accordance with the expression $$\varepsilon_r \approx \frac{a_2 b_2 \varepsilon_{a1}(q_{t1} - 1) - a_1 b_1 \varepsilon_{a2}(q_{t2} - 1)}{a_1 b_2 a(q_{t2} - 1) - a_2 b_2(q_{t1} - 1)}$$

wherein $\varepsilon_r$ is the first parameter compensated for the further parameter; whereby the apparatus in use generates as an output a signal that is indicative of the first parameter.

In a third embodiment, a method of determining a parameter of a borehole system, the method comprising:

using apparatus comprising three sensors of electromagnetic energy to generate output signals indicative respectively of differing mixtures of values of a first parameter of the borehole system, a second parameter of the borehole system and a third parameter, wherein the processing apparatus is programmable and is programmed to perform a method comprising the steps of converting the signals output by the sensors by:

a. fitting the sensor geometric factors with a suitable mathematical function;

b. using the equation $\varepsilon_a = q_m \varepsilon_m + q_r \varepsilon_r + q_t \varepsilon_t$, the equation $q_t + q_m + q_r = 1$ and the function from Step a. to solve for the third parameter; and c. equating the resulting expression for two different sensors thereby eliminating the third parameter from Step b. and giving an expression that has input from two sensors with two unknowns.

The method according to the third embodiment, wherein the step a. of fitting the tool geometric factor with a mathematical function includes fitting the tool geometric factor with a function of the form $q_m = a[1-\exp(-br)]$ (Equation 2).

The method according to the third embodiment, wherein the step a. of fitting the tool geometric factor with a mathematical function includes fitting the tool geometric factor with a function of the form $q_m = a[1-\exp(-br)]$ (Equation 2) and further including the step of Taylor series expanding Equation 2.

The method according to the third embodiment, further including analysing the sensor outputs in accordance with the expression $$\varepsilon_r \approx \frac{a_2 b_2 \varepsilon_{a1}(q_{t1}-1) - a_1 b_1 \varepsilon_{a2}(q_{t2}-1)}{a_1 b_2 a(q_{t2}-1) - a_2 b_2 (q_{t1}-1)}$$

wherein $\varepsilon_r$ is the first parameter compensated for the second parameter, whereby to generate as an output signal that is indicative of the first parameter.

The method according to the third embodiment, wherein the first parameter is the dielectric constant or permittivity of a layer forming part of the borehole system.

BRIEF DESCRIPTION OF THE DRAWINGS

There now follows a description of preferred embodiments, by way of non-limiting example, with reference being made to the accompanying drawings in which.

DETAILED DESCRIPTION OF EMBODIMENTS

Referring to the figures apparatus 10 for determining the values of properties of layers of or associated with a borehole 11, and a borehole system incorporating such apparatus 10, are illustrated. The borehole 11 is shown extending through part of the Earth's crust in a manner that is familiar to those of skill in logging and related disciplines.

Figure 1:
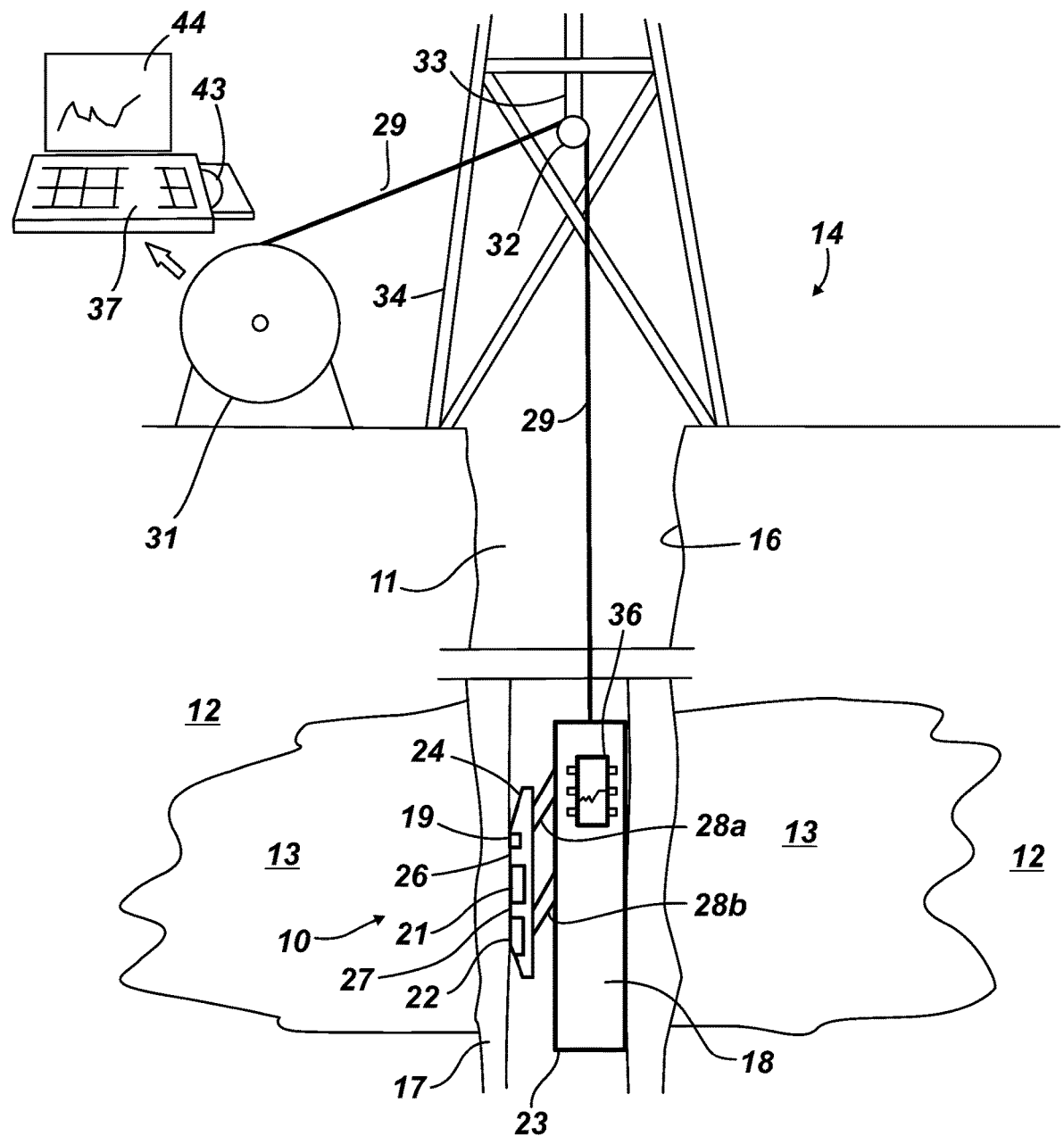
FIG. 1 is an elevational view, not to scale, of a borehole system apparatus, FIG. 1 further schematically illustrating one exemplary (non-limiting) form of non-transitory computer readable medium and also illustrating steps in a method.

The borehole 11 is formed in rock 12 e.g. by drilling or by another method as will be known to those of skill in the art; and may extend for hundreds or thousands of meters or feet, as indicated schematically in FIG. 1. The aim of creating the borehole 11 in the illustrated embodiment is to penetrate a schematically illustrated formation 13 that contains e.g. within pores in the rock 12 a fluid, or mixture of fluids, of interest as exemplified herein. The borehole may have as its primary purpose the exploration of the formation 13 or the extraction of fluid(s) of interest to an uphole, surface location 14. Boreholes such as borehole 11 also may be created and logged for other purposes. Non-limiting examples of such further purposes are also given herein.

Borehole 11 is shown extending essentially vertically downwardly, but as explained this need not necessarily be the case. Thus, inclined and horizontal boreholes are known, as are boreholes the directions of which are not constant along their lengths.

The wall 16 of borehole 11 typically is rugose as schematically shown in FIG. 1.

Over at least part of its length, most typically coinciding with the section of borehole 11 extending through formation 13, the wall 16 of the borehole 11 includes on its radially inner surface a layer 17 of mud cake. This layer 17 in most cases is annular or at any rate continuously formed on the inner surface of the borehole.

As is well known, mud cake forms from chemicals and other components that may be introduced into a borehole e.g. during drilling or at other times. Mud cake typically forms into a layer as a result of the porosity of the rock of a formation such as formation 13 and the nature of the chemicals in the borehole. In some cases, mud cake forms over a substantial length of a borehole and in others it extends over only part of the borehole length. The layer 17 of mud cake is shown somewhat schematically in FIG. 1. As explained, mud cake has an adverse effect when seeing to establish the dielectric constant of rock existing radially outwardly of the mud cake layer 17.

The borehole system in FIG. 1 where it passes through the formation 13 can be thought of as having n layers constituted respectively by the formation 13 and the mud cake layer 17, with the consequence that in the illustrated embodiment n=2.

The apparatus 10 is or forms part of a logging tool 18 and includes (2n-1) sensor members. Since in the exemplary embodiment shown n=2, three sensor members 19, 21 and 22 are provided. In other embodiments, the number n may in theory be an integer number having a value of 2 or greater, although in practice it is likely that n usually will be 2 or 3.

Logging tool 18 includes a rigid, elongate, cylindrical body 23. The sensor members 19, 21 and 22 are each supported in a pad 24 such as to present respective sensor surfaces or sensor planes as described further in relation to FIG. 2 below for contact with the radially inner surface of the layer of mud cake 17 or the wall 16 defining the radial extremity of the borehole 11.

To this end pad 24 includes a pad surface 26 with which the sensor surfaces or sensor planes of the sensor members 19, 21, 22 are coterminous. Pad 24 includes a pad body 27 supported by a pair of arms 28a, 28b that each are pivotally secured at one end to the pad body 27 and at the other end to the logging tool body 23. Such an arrangement is well known in subterranean tool design and permits the pad 24 to be moved from a retracted position adjacent the logging tool body 23 to a position offset therefrom as shown in FIG. 1, with the pad 24 remaining essentially parallel to the elongate axis of the logging tool body during movement as aforesaid. Motors or other deployment actuators are provided within the logging tool body 23 for the purpose of effecting powered movement as described.

Other means of supporting sensors relative to a logging tool will occur to the person of skill in the art as being suitable for use in the embodiments. All such variants are within the scope of the disclosure hereof. A further, non-limiting example is described herein.

The logging tool body may include a recess that is not visible in the figures, for receiving the pad 24 when it lies adjacent the logging tool body 23. Thus, the pad 24 may be arranged to protrude no further than the exterior of the logging tool body 23 when it occupies its retracted position. Such an option is familiar to those of skill in the logging tool art and is useful for protecting the pad 24 and the sensor members 19, 21, 22 during deployment of the logging tool 18 from a surface location to a location at which logging is to take place.

The sensor members 19, 21, 22 are spaced from one another in a line extending along sensor pad surface 26. This assures that the sensor members 19, 21, 22 when operating assess the same azimuthal region of the rock 12.

In the illustrated embodiment deployment of the logging tool 18 takes place using wireline 29, although this need not necessarily be the case; and other deployment methods lie within the scope of the disclosure hereof.

Wireline 29 is very well known in logging and consists of armored cable that serves the purposes of (a) supporting the mass of a logging tool such as tool 18 against gravity as it is deployed; (b) providing electrical power for powering the logging tool 18 and activating the motors to cause movement of the arms 28a, 28b and hence deployment of the pad 24 to the offset position shown; and (c) permitting the telemetering of electrical signals between the surface location 14 and the logging tool 18. Such signals may include commands sent from the surface location 14 to the logging tool in order to effect one or more control actions (such as but not limited to activation of the motors as aforesaid); data or other feedback signals sent from the logging tool 18 to the surface location to indicate the occurrence of one or more events (such as but not limited to correct deployment of the pad 24); and/or log data sent from the logging tool as a result of operation of the sensor members 19, 21, 22.

In FIG. 1, the wireline 29 is shown being dispensed from a motorized drum 31. This is one method of several within the scope of the present disclosure by which wireline 29 may be dispensed. In FIG. 1, the drum 31 is fixed at the surface location 14 but in other embodiments it may be mounted in a logging truck of a kind familiar to those of skill in the art or may be deployed in other ways as is known in the art.

In the FIG. 1, arrangement the wireline 29 passes over a pulley 32 forming part of a travelling block 33 of a derrick 34 installed at the surface location 14 at the uppermost end of the borehole 11. As a result, the wireline may readily be dispensed from the drum 31 into the borehole 11 in a manner well known to those of skill in the art.

However, as will also be familiar to those of skill in logging disciplines, there exist numerous other ways of dispensing wireline so that it may support a logging tool, and such methods are within the scope of the disclosure hereof.

The sensor members 19, 21, 22 may be of various designs, and exemplary non-limiting sensor member arrangements are described herein. The sensor members 19, 21, 22 are such as to detect electromagnetic energy: (a) in the case of one or more of the sensors being a coplanar waveguide 22, transmitted along the sensor; and/or (b) in the case of one or more of the sensors being a coplanar waveguide 22 or a reflectometer sensor 19, 21, reflected at the interface between the sensor members and an adjacent layer such as the mud cake layer 17. Non-limiting, exemplary ways in which this may be achieved also are described herein.

In general, the apparatus 10 includes one or more generators of electromagnetic energy that can be transmitted to the sensor members in a manner giving rise to detectable, transmitted or reflected energy. The detected energy causes the sensor members to generate signals e.g. in the form of voltages or currents that are in some way proportional to the magnitude of the detected energy at any instant.

The sensor members 19, 21, 22 are connected, e.g. by way of a wired or wireless connection, to such a generator of electromagnetic energy and also to processing apparatus that is capable of calculating properties of the n layers in accordance with method steps described herein.

In FIG. 1, two processing apparatuses are shown, being respectively one or more on-board microprocessors 36 or other programmable devices that form part of or at least are supported by the logging tool 18; and one or more remote computers 37 or other remote processing devices. Alternatively, non-programmable or minimally reconfigurable processing devices, such as but not limited to one or more electronic circuits, may be provided.

The apparatus 10 thus may include a combination of on-board and remote processing devices as illustrated; or the processing capability may be provided by a single type of processing apparatus. Typically but not necessarily any on-board processing device such as microprocessor 36 is hard-wired to receive the outputs of the sensor members 19, 21, 22. Also typically but not necessarily any remote computer 37 or other remote processing device forming part of the apparatus 10 is connected e.g. by way of a wired or wireless connection signified by the arrow in FIG. 1 to the wireline 29 such that signals generated at the sensor members 19, 21, 22 may be processed in the remote computer 37 or other remote processing device(s). Any such remote devices may be located near to the uphole end of the borehole 11, or may be removed a considerable distance therefrom. As necessary any suitable means may be included for ensuring that the signals transmitted via the wireline 29 are in the correct form for processing in the computer 37.

In some embodiments, the processing devices such as microprocessor 36 and remote computer 37 are arranged to process the signals generated by the sensor members 19, 21, 22 immediately they are created, or with only a short delay. However, it is also possible for the apparatus 10 to effect processing of the signals following a delay that may be of significant duration in some circumstances. Moreover, it is not a requirement that e.g. any remote computer 37 forming part of the apparatus 10 is dedicated in function or permanently connected to the remainder of the apparatus; it is not a requirement that any remote computer 37 is constituted as a personal computer as illustrated; and moreover, more than the one or two described processing devices may be provided. Thus, overall the processing means forming part of the apparatus 10 may take a variety of forms, may operate in a variety of ways and may exist in a variety of possible locations and numbers.

The disclosure hereof includes all such variants within its scope.

Each of the sensor members 19, 21, 22 has a geometric factor that is known in advance or may be calculated in the borehole system in which the apparatus 10 is used.

The term "geometric factor" (and its synonym "depth of investigation (DOI) profile") is familiar to those of skill in the logging tool art, and describes the response of a logging measurement or signal, generated by a logging device, as a function of distance from the logging device (sensor member, etc.) under consideration. Thus, the geometric factor of a logging device or a sensor thereof describes the output of the logging device at any chosen depth of penetration, relative to the signal-generating part of the device, that it is possible for the device in question to achieve.

As explained below, certain sensor designs described herein operate through reflection of energy caused by an impedance mismatch between the sensor and a series of n layers with the radially innermost of which it is in contact. In such embodiments the apparatus does not seek to detect energy that has passed through the rock. The term "penetration" in such embodiments indicates the depth into the rock to which the apparatus is able to detect useful information in the reflected energy.

By reason of their differing designs as described below, the geometric factors of the sensor members 19, 21, 22 in the apparatus 10 differ from one another in a borehole system having n layers, such as the system of FIG. 1 in which the apparatus 10 is used.

Figure 2:
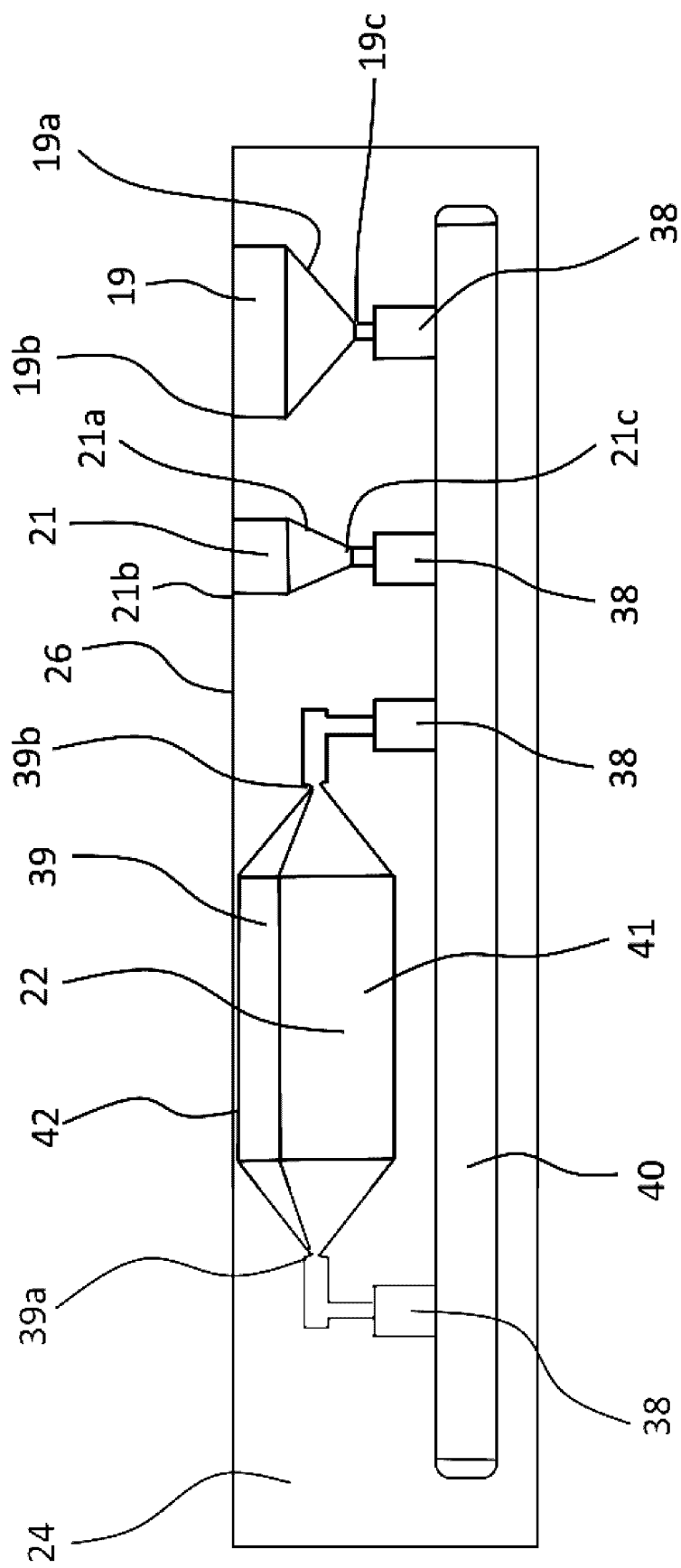
FIG. 2 shows part of the FIG. 1 apparatus in more detail.

As best shown in FIG. 2, the sensor members 19 and 21 are respective open-ended, coaxial reflectometer sensor members of respectively differing geometries.

The sensor members 19, 21 include respective hollow, conical recesses 19*a*, 21*a* that are formed in one or more blocks of conducting material such as a metal. The recesses 19*a*, 21*a* allow a coaxial waveguide to increase its diameter while simultaneously maintaining an intrinsic impedance of (in the illustrated, non-limiting embodiment shown) 50Ω.

The conical recesses 19*a*, 21*a* each terminate in a respective open end 19*b*, 21*b* as illustrated. Each of the open ends 19*b*, 21*b* is coplanar with pad surface 26 such that when the pad surface 26 is in contact with e.g. the mud cake layer 17 the open ends of the reflector sections contact the latter to define an interface at which signal reflection may be detected.

Each of the recesses 19*a*, 21*a* is formed coaxially with a conductor that is omitted from FIG. 2 for clarity and that extends to the respective cone apex 19*c*, 21*c*. The hollow interiors of the conical reflector sections are filled with a dielectric material. In many embodiments the dielectric material is the same for each of the coaxial reflectometer sensors 19, 21; but it is possible in contrast for mutually differing dielectric materials to be used in other embodiments. A wide range of non-conducting materials is suitable for the dielectrics. Non-limiting examples include glass, various plastics, ceramics, rubber, mica and epoxies.

In the embodiments illustrated, the dielectric material and the coaxial conductor are coterminous with the open ends of reflector recesses 19*a*, 21*a* that as mentioned are coplanar with the pad surface 26.

The conductors in the recesses 19*a*, 21*a* are electrically connected by way of connectors 38 such that detected electromagnetic energy generates voltage or current signals that are indicative of the detected energy magnitude and phase. The connectors 38 are operatively connected to one or more signal transmission lines 40, illustrated somewhat schematically in FIG. 2, that permit the one or more processing devices 36 and/or 37 to determine properties of the n layers (two layers in the described embodiment) in accordance with steps of the method of the present disclosure. The signal transmission lines 40 are embodied in preferred embodiments as printed circuit boards (PCBs), although other forms of conductor are possible within the scope of the disclosure hereof.

The recess 19*a* of sensor member 19 has a shallower cone angle than that of recess 21*a* of sensor member 21. The coaxial sensors 19, 21 each amount to the termination of a transmission line. The energy propagating down the transmission line meets an impedance mismatch at the interface of the sensor and the matter beyond the interface. This impedance mismatch reflects a portion of the signal back into the logging tool. The reflected signal is analyzed to gain information about the matter beyond the interface, which in use of the apparatus 10 is a geological formation.

The depth of investigation (DOI) is related to a fringing effect on the E-field at the termination of the coaxial system consisting of the conical recess, its associated central electrode 46 described below and any coaxial cable connected to supply it. The size of the fringing effect (and hence the DOI) is governed largely by the diameter of the termination. As a result, a bigger (i.e. larger terminal diameter) sensor reads more deeply than a smaller sensor.

Figure 3:
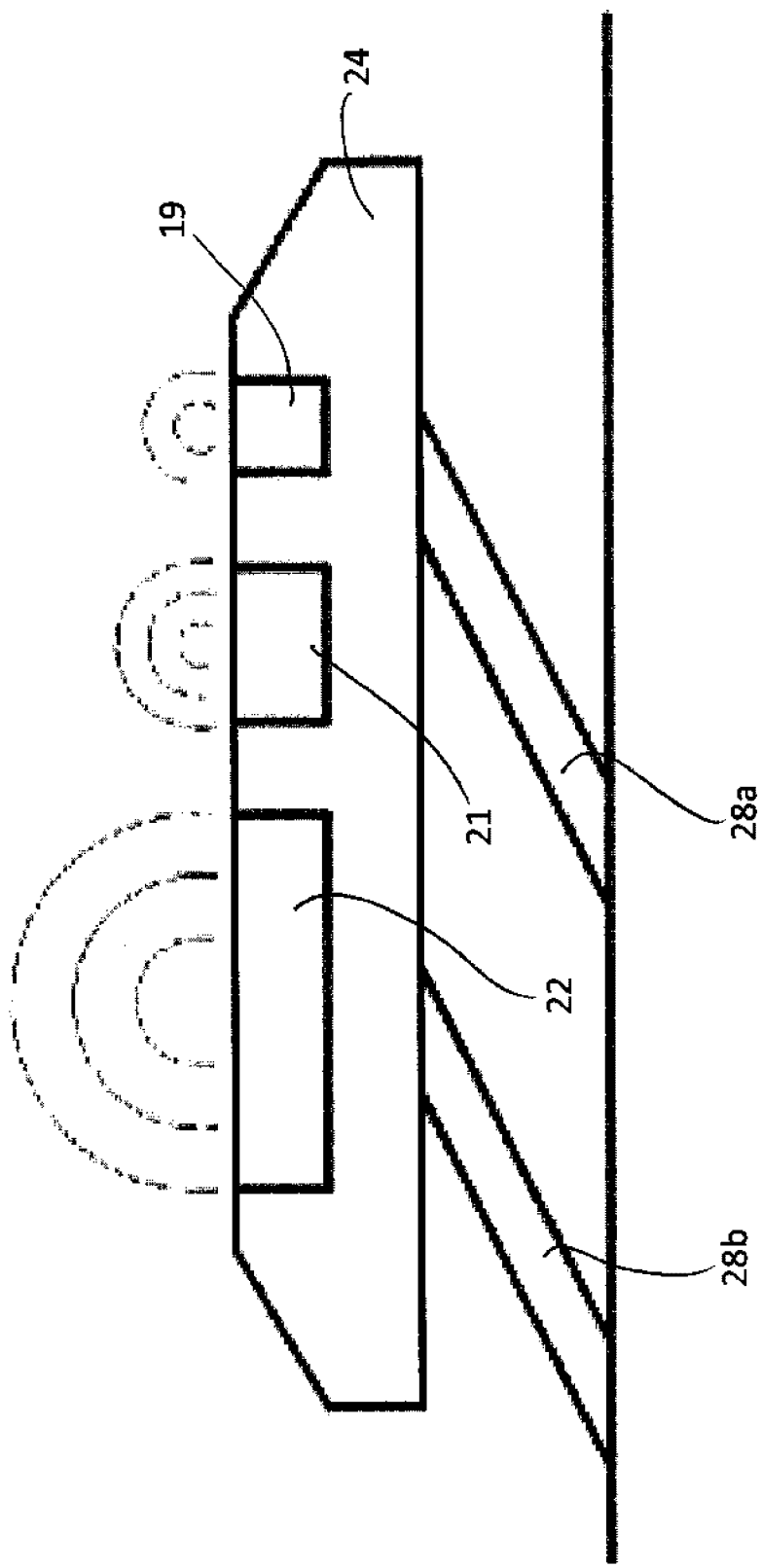
FIG. 3 shows in schematic form an operational mode of the apparatus of FIG. 2.

This effect is illustrated schematically in FIG. 3, which shows by way of dotted lines the relative depths of investigation of the sensors 19 and 21.

Sensor member 22 has a different fundamental design than sensor members 19 and 21. In particular, sensor member 22 is formed as an elliptical coplanar waveguide sensor. Examples of this type of sensor are described in detail in GB 1518353.6.

Sensor member 22 includes an elongate, elliptical or truncated-elliptical cross-section substrate 39 formed of a dielectric material. Suitable dielectric materials for this purpose will be known to those of skill in the art and non-limitingly may include those listed above. The substrate 39 is of constant (elliptical or truncated elliptical) cross-section over most of its length and tapers to respective end points 39*a*, 39*b* as illustrated in FIG. 2.

Substrate 39 is backed, over part of its elliptical shape, on a reverse side that in use is remote from the mud cake layer 17 or borehole wall 16 by a conducting earth layer 41. The earth layer 41 extends over the length of the substrate 39 and conforms to the shape of the reverse side. Thus, the earth layer also tapers to meet the end points 39*a*, 39*b*.

A conducting line or strip 42 extends along the substrate 39 between the end points 39*a*, 39*b* on the opposite side to earth layer 41. The conducting line 42 is spaced, and hence isolated, from the earth layer 41. The conducting line 42 is coplanar with the pad surface 26 over most of its length. The resulting cross-sectional arrangement of the coplanar waveguide sensor member 22 is illustrated schematically in FIG. 4*a*.

As best shown in FIG. 3 the sensor member 22 is capable of detecting energy that is transmitted along the conducting line and is influenced by conditions somewhat further from the pad than is the case for the sensor members 19, 21. The sensor member 22 therefore is the most deeply reading of the three sensors exemplified in FIGS. 2 and 3.

In an alternative operational mode, the sensor member 22 could be used as a reflective sensor. This would provide the same geometric factor as when the sensor member 22 is operated in a transmission mode as described above, but operation of the sensor member 22 in a reflection mode would only be viable if the reflected signal strength was sufficient to permit this.

The preferred form of analyzer intended for use in the described embodiments is a vector network analyzer (VNA). A VNA can be configured to measure both transmitted and reflected signals. This opens the option of an operational mode in which reflected and transmitted signals are detected simultaneously at the sensor member 22 and processed using the described/illustrated apparatus. Such a mode is within the scope of the disclosure hereof.

As noted, other sensor designs are possible within the scope of the disclosure. As one non-limiting example illustrated in FIG. 5, coplanar waveguide sensor member 22 could be replaced by a further conical, open-ended coaxial reflectometer sensor 22' that is capable of reading to a different depth than sensor members 19 or 21. In a further non-limiting example illustrated in FIG. 6 one or both of the sensor members 19, 21 could be replaced by a further coplanar waveguide sensor such as sensor member 21' shown. Various other options are also possible.

Figure 5:
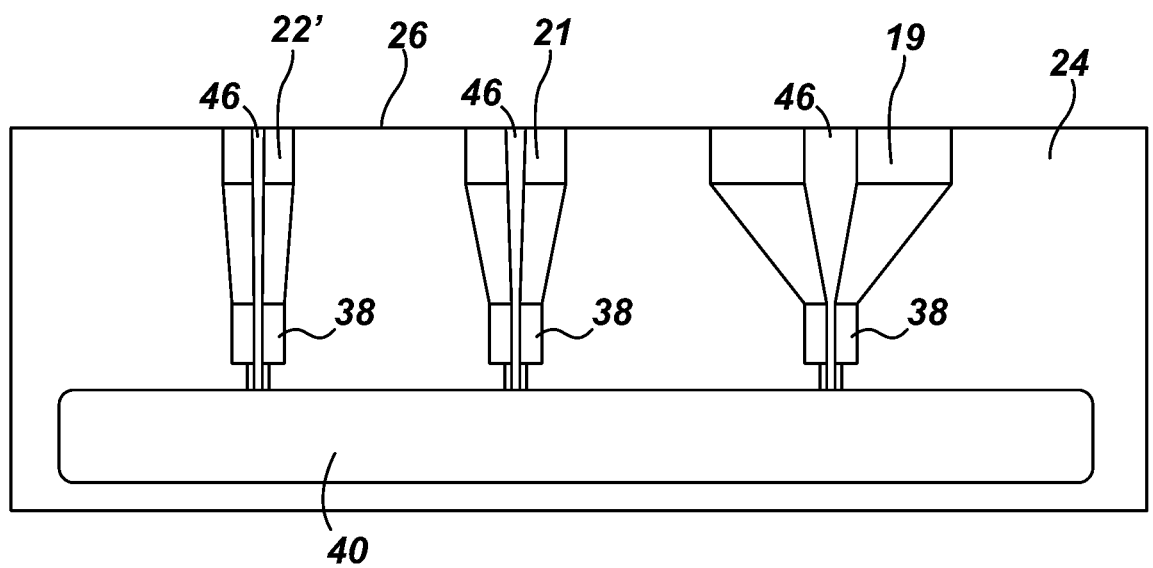
FIGS. 5 and 6 show variants on the arrangements of sensors that may be supported in a pad such as that shown in FIGS. 2 and 3.
Figure 6:
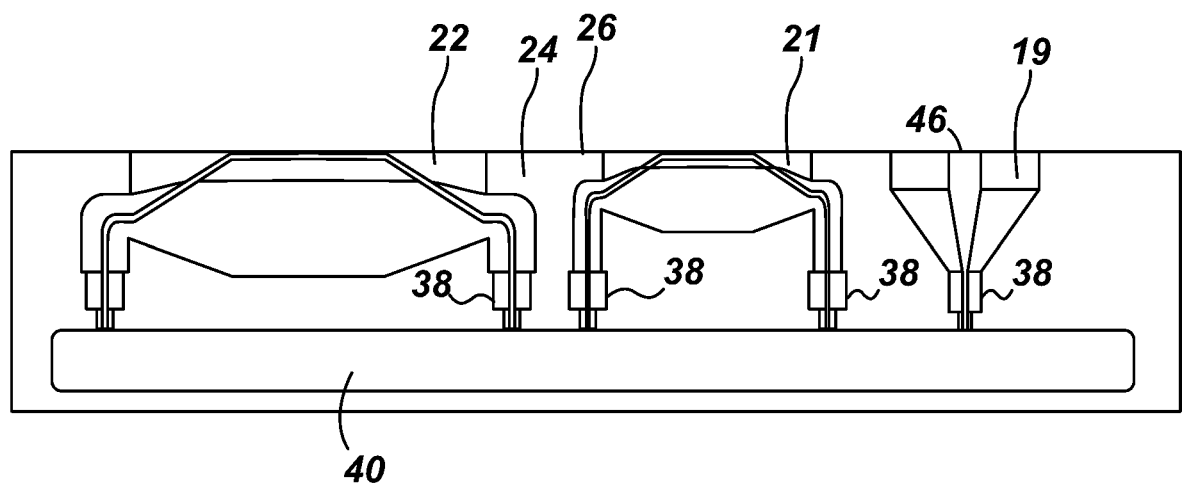

In FIGS. 5 and 6, parts such as the pad 24, surface 26, connectors 38 (described below) and PCB 40 are similar to the counterpart features of FIG. 2 and are therefore represented by the same reference numerals. However, this need not be the case; and other installation and connection arrangements are possible within the scope of the disclosure hereof.

FIGS. 5 and 6 illustrate coaxial electrodes 46 that are present in the coaxial reflectometer sensor types 19, 21. These electrodes extend from the respective connectors 38 to the open ends of the conical recesses. They provide for a coaxial energy path which is necessary for operation of the respective sensor members 19, 21.

Referring again to FIG. 2 by way of example, the end points 39a, 39b of sensor member 22 are electrically connected to further connectors 38 formed within pad 24.

The connectors 38 are connectable to one or more sources of electromagnetic energy that in use energies the sensor members 19, 21, 22 (or 19, 21, 22' or 19, 21', 22) in microwave frequencies in order to give rise to detectable energy reflections (sensors 19 & 21 and, in some modes of use, sensor 22) or transmission (sensor 22) at the sensor members 19, 21, 22. Such sources may readily be embodied in the electronics section of logging tool 18. Precise details of arrangements for generating the electromagnetic energy required for operation of the apparatus 10 will occur to those of skill in the art and do not need to be described in detail herein.

The connectors 38 also serve as terminals for the connection of one or more analyzers of the energy detected at the sensors 19, 21, 22 that arises when the logging tool 18 is in use to log part of a borehole 11. As a non-limiting example of an analyzer type that may be employed one may consider a vector network analyzer or similar device, the operative parts of which also may be housed in an electronics section forming part of the logging tool 18.

The analyzer is capable of conditioning voltage and/or current signals generated at the sensor member connectors 38. Following such conditioning the resulting energy values may be recorded e.g. in a memory device forming part of the logging tool, and/or they may be transmitted for example by way of wireline 29 if the latter is present. The energy values may be processed e.g. using a processor such as processing device 36 or using a remote processing device such as computer 37.

A memory device if provided in the logging tool 18 may be part of or associated with the processing device 36, or it may be a separate component. Composite memory devices are possible in which the memory function is provided by more than one device.

The computer 37 may also include one or more memory devices for similar purposes. Such memory may be provided as on-board memory capacity or an external device such as but not limited to an EEPROM "flash" memory; various other memory types including so-called "cloud" memory; or a readable/writeable disk such as disk 43 visible in FIG. 1 that may be read and/or written to by the computer 37.

Computer 37 and/or processing device 36 includes and/or is operatively connectable to a display, printer (such as illustrated display 44), plotter or similar device that is capable of reproducing the results of using the apparatus 10 (i.e. log signals) in a form that is interpretable by humans and/or may be machine-read. In the described embodiment a display 44 is provided but it should be noted that this aspect may take any of a wide range of forms. The display 44, etc., is capable of generating a visual image that is representative of variations in the log signals corresponding to properties of the rock 12 surveyed by the apparatus. The visual image may be of a kind that can be interpreted by human log analysts; and/or may be of a type that can be interpreted by machines such as computers.

The log data generated by the apparatus 10 however does not need to be in a visually identifiable form, and instead may be stored, transmitted and/or further processed e.g. as a data file or similar.

As noted herein, the borehole system illustrated in FIG. 1 includes apparatus 10 according to the disclosure hereof that may be deployed so as to be operatively positioned to detect energy reflected at the sensor members 19, 21, 22 in a system in which n=2. Also as noted in the embodiment indicated, the n layers surveyed using the apparatus 10 are the mud cake layer 17 and the formation 13. As is apparent from FIG. 1 these layers are substantially coaxial with the borehole 11. Exact coincidence of the longitudinal axes of the borehole 11, mud cake layer 17 and formation 13 is unlikely to be possible owing to the rugosity and non-straight nature of a typical borehole 11 once it has been formed.

Figure 7:
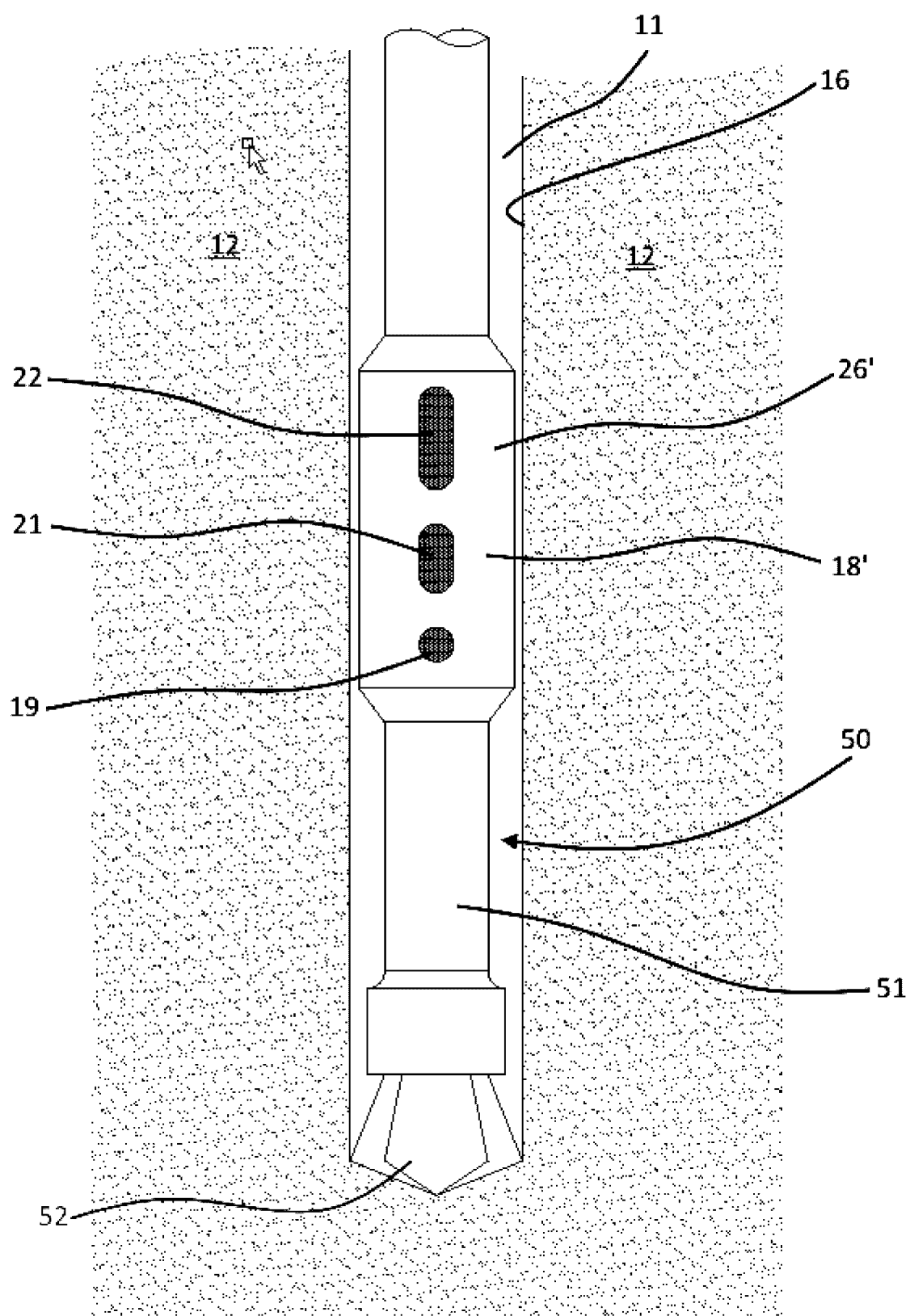
FIG. 7 shows a further mode of supporting a plurality of sensors that is of particular benefit in "logging while drilling" (LWD) operations.

FIG. 7 shows another form of apparatus 50 according to the disclosure hereof.

FIG. 7 shows a borehole such as borehole 11 while it is being formed, by drilling, in the rock 12. In FIG. 7 therefore the logging toolstring 18 is not present and instead a drill string 51 is shown.

Drill string 51 terminates at its in use lowermost end in a drill head 52 that is shown schematically in the figure. Drill head 52 includes typically several cutter elements that may be caused to rotate in one way or another in order to cut into the rock 12 and thereby form the borehole 11. As is well known, numerous methods may be employed for the purposes of activating the drill head, causing it to advance as the borehole 11 is formed and clearing drilled rock elements from the borehole 11 during operation of the drill head 52.

Some forms of drill string 50 are capable of changing direction while being operated, in order to cause the borehole 11 to adopt a particular route through the rock. This may be done e.g. to ensure that the borehole passes maximally through a formation 13 of commercial value; or to avoid regions of rock that are problematic by reason of being unstable or difficult to drill.

When using a steerable drill head of this type it is desirable that any commands sent from a surface location to cause adjustment of the trajectory of the drill head are as accurate as possible and also take account of the instantaneously prevailing conditions encountered in the borehole 11.

To this end, it is known to incorporate a logging section 18' in the drill string 50, usually a short distance uphole of the drill head 52 as illustrated. Such a logging section 18' may produce log data (signals) in real time or near-real time that may be highly effective in controlling the steering of the drill head 52. Such log data may be telemetered to a surface location and used after recovery of the logging section at the end of drilling; but more commonly they are conveyed to programmable or commandable parts of the drill string 50, or to programmable/commandable apparatus operatively connected to the drill string 50, in order to effect control effectively in real time.

Such techniques are often referred to as "logging while drilling", or LWD. This term is familiar to those of skill in the art.

In the embodiment shown in FIG. 7, the logging section 18' is a rigid cylinder of an external diameter slightly less than the inner diameter of the borehole 11; although other forms of logging section 18' are possible within the scope of the disclosure hereof.

The logging section 18' may be considered as an alternative form of support for supporting the sensor members of the apparatus of the present disclosure. The latter is in the illustrated embodiment provided in combination with the processing apparatus (that in an LWD application is contained within the logging section or another part of the drill string to which the logging section is connected in a manner permitting the transmission of signals from the logging section 18' to the processing apparatus). Thus, the logging section 18' includes supported on an exterior surface 26' thereof sensor members that are similar to those of the apparatuses illustrated in FIGS. 1-3, 5 and 6.

In FIG. 7, sensor members 19, 21 and 22 are set into the surface 26' of the logging section such that they can contact the wall 16 of the borehole 11. When energized as described herein therefore the sensor members 19, 21 and 22 may cause the generation of detectable energy. In the case of the coplanar waveguide sensor member 22 this may be transmitted or reflected energy, as explained above; and in the case of the hollow reflectometer sensor members 19, 21 the detectable energy may be reflected energy.

The sensor member arrangements of FIGS. 5 and 6 also may be employed in a logging while drilling arrangement that is broadly similar to that shown in FIG. 7.

The LWD arrangement of FIG. 7 is an example of support of the sensor members 19, 21, 22 on a mandrel. Other mandrel-type supports are known and are within the scope of the disclosure hereof.

The output signals of the sensor members 19, 21, 22 of FIG. 7 may be processed in accordance with method steps as described herein in order to generate measures of the permittivity of the rock 12 that may be used to generate commands for guiding the drill head 52.

As in the case of the embodiments of FIGS. 1-3, 5 and 6, it is not necessary for the outputs of all three sensor members 19, 21, 22 to be processed in order to generate parameter values of interest. Techniques for utilizing fewer than the three sensor output signals are described below.

As indicated, the disclosure extends to a method of determining properties of n layers of a borehole system as described. In the described embodiment the properties are the thickness of the mud cake layer 17; the dielectric constant of the mud cake layer 17; and the dielectric constant of the formation 13. However other properties can if desired be pursued using apparatuses and methods in accordance with the disclosure hereof.

The steps in the method include supporting a plurality of (2n-1) sensors 19, 21, 22 of apparatus 10, 50 as described herein, in which the geometric factors of the sensors 19, 21, 22 mutually differ and are known or calculable, in a borehole 11 of a borehole system as illustrated. Such supporting of the apparatus 10 typically is the result of a deployment activity of a kind that is known to those of skill in the art. As explained the sensors 19, 21, 22 are capable of detecting reflected or transmitted (as appropriate) electromagnetic energy and generating log signals (typically electrical signals) indicative of the magnitude and other parameters of the reflected energy. The method includes energizing the sensor members 19, 21, 22 using signal generating features as described herein such that the properties of the n layers can be calculated. The method further includes detecting such energy levels at each of the (2n-1) sensor members 19, 21, 22 and based on the energy values detected at each of the sensor members 19, 21, 22 determining the values of each of the properties of interest.

The method may include repeating the foregoing steps at each of a plurality of borehole depths. It also optionally includes repeating the steps in respect of a variety of sensor member energizing parameters. Such parameter variations may relate e.g. to energizing waveform amplitude, frequency and phase.

The method may include activating one or more analyzers of detected energy as described herein; and as desired operating one or more processing devices, such as devices 36 and/or 37, to derive the values of the properties of interest.

A. Conformal Mapping of Coplanar Waveguide Sensor Member

In the specific example described as explained, the cross-section of the coplanar waveguide sensor member 22 over most of its length is elliptical or ellipsoidal. In order to assist in determining the properties of the mud cake layer 17 and formation 13 based on activation of this sensor member it is desirable to model the sensor in accordance with a conformal mapping technique in order to establish its geometric factor in the borehole system under consideration. Conformal mapping techniques also are useful in establishing the geometric factors of the open-ended coaxial reflectometer sensor members 19, 21. FIGS. 4a to 4d illustrate how this technique may be applied to the coplanar waveguide sensor member 22.

Figure 4A:
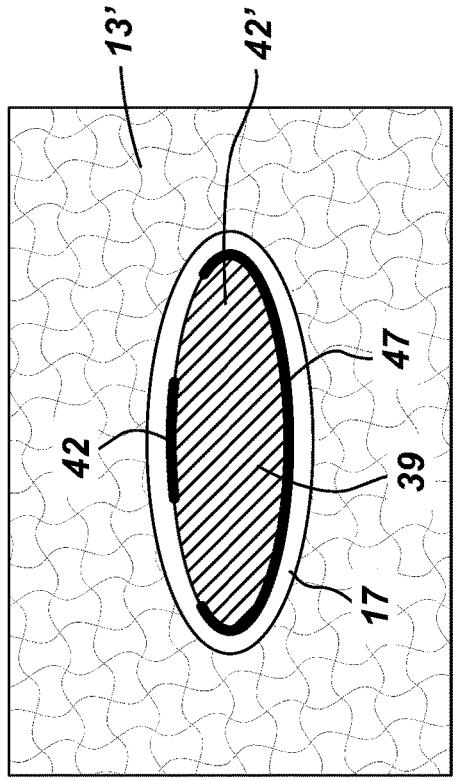
FIGS. 4a to 4d show the steps in a process of modelling the geometry of a multi-layer borehole system using conformal mapping.

FIG. 4a, shows the main components of the borehole system, including the borehole 11, essentially concentric mud cake layer 17, formation 13, elliptical sensor substrate 39, conducting earth plane 41 and conducting line 42.

Figure 4B:
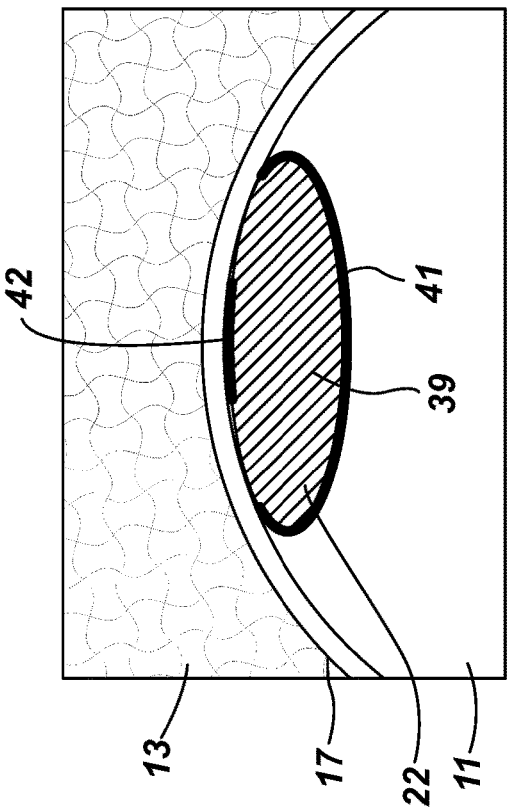

In FIG. 4b, in a first stage of the conformal mapping process the effects of the borehole 11 and any fluid in it are disregarded and the mud cake 17' and formation 13' modelled so as to wrap around the elliptical sensor member 22. The latter assumption is believed to be valid because the earth layer electrode 41 shields the reverse side of the sensor member 22 thus restricting the electric field generated on energizing of the sensor member 22 to the side of conducting line 42.

Figure 4C:
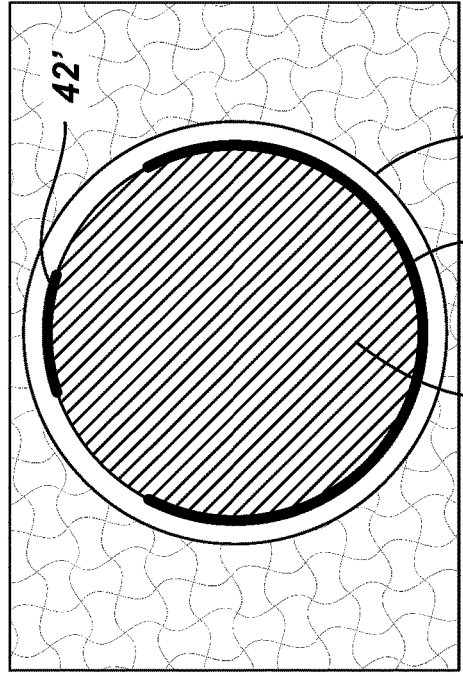
Figure 4D:
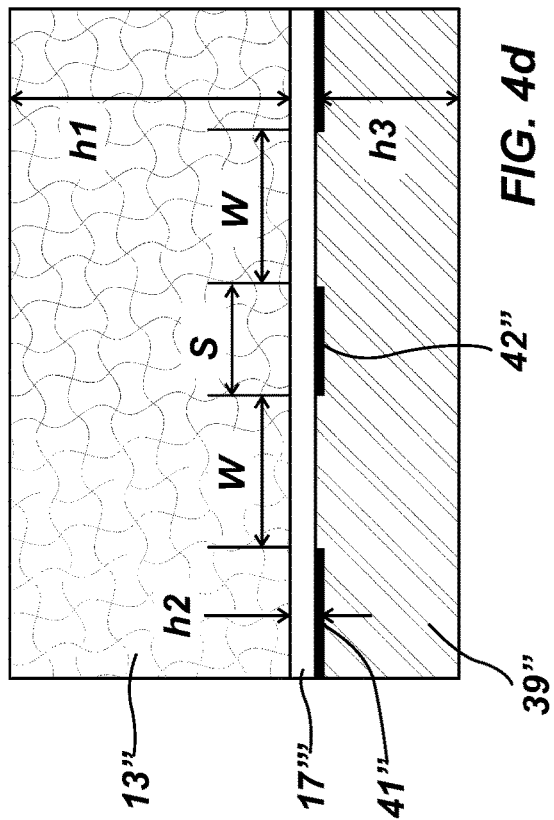

Thereafter, as illustrated schematically in FIG. 4c, the elliptical domains of FIG. 4b are conformally mapped to circular form as illustrated. These are then further mapped (FIG. 4d) onto a linear image in which numeral 39" represents the mapped sensor member substrate; 41" the mapped earth layer; 42" the mapped conducting line; 17''' the mapped mud cake layer; and 13" the mapped formation. Certain self-evident dimensional parameters of the thus-mapped system are marked in FIG. 4d.

Following such modelling of the sensor member system it is assumed that the boundaries between the adjacent dielectric layers 39", 41"/42", 17''' and 13" are magnetic walls. This approximation allows the total capacitance of the system to be calculated as the sum of the partial capacitances from each layer.

B. Permittivity Determination Method Using Three Sensors in Two Layers

The filling factor for each layer is then given by the ratio of the capacitance of that layer to the total capacitance. The filling factors (q) then relate the fractional contribution of each dielectric layer to the effective measured dielectric constant. This relationship is given by the equation $$\varepsilon_a = q_r(h_m)\varepsilon_r + q_m(h_m)\varepsilon_m + q_t\varepsilon_t \quad (1)$$

Where $\varepsilon_m$ is the relative dielectric constant for the mud cake layer, $h_m$ is the thickness of the mud cake layer and $\varepsilon_r$ is the relative dielectric constant for the rock layer. The tool dielectric constant $\varepsilon_t$ is known by design or from testing that can be carried out after the tool is constructed.

The suffix a is used to denote the apparent dielectric constant of the multi-layer system, as measured using a sensor of the kinds described herein.

From the permittivity measurements taken using each sensor and equation (1) it is possible to construct three unique objective functions which can be used to solve for the three unknowns using a standard numerical minimization algorithm such as but not limited to Levenberg-Marquardt or Gauss-Newton. Other forms of minimization technique, as will be known to the person of skill in the art, may be equally successful in the methods described herein.

Most numerical minimization algorithms require estimated values for the unknown parameters in order to start the minimization. The choice of estimate can have very profound effects on the solution as minimization algorithms tend to find local minima rather than global ones. It would therefore be beneficial to seed the minimization algorithm in some sensible way.

C. Two-Variable Seeding Calculation

One method of estimating the mud cake correction from two measurements is to approximate the q-factor for the mud cake layer as an exponential function with the form:

$$q_m = a\,[1-\exp(-br)] \quad (2)$$

Where a and b are sensor-dependent constants and r is a distance measured from a sensor face. Unfortunately, it is not possible to use equations (1) and (2) to solve for $E_r$ directly, but it is possible to solve for $E_r$ if use is made of the first order linear expansion of equation (2). After some algebra the result is:

$$\varepsilon_r \approx \frac{a_2 b_2 \varepsilon_{a1}(q_{t1}-1) - a_1 b_1 \varepsilon_{a2}(q_{t2}-1)}{a_1 b_2 a(q_{t2}-1) - a_2 b_2(q_{t1}-1)} \quad (3)$$

Using equation (3) it is generally found that the two deepest reading sensors will produce a result that is closest to the correct rock dielectric constant whereas the two shallowest reading sensors tend to the dielectric constant of the mud cake. This conveniently gives two of the three values needed to seed a numerical minimization algorithm. Mud cake thickness does not usually exceed 20 mm so a suitable estimate is relatively easy to make.

Use of an appropriate minimization algorithm then yields the properties indicated, namely the thickness and dielectric constant of the mud cake layer 17 and the dielectric constant of the formation 13.

It should be noted that use of the seeding method described above is not essential. Numerous alternative methods of seeding the three-variable determination of formation relative permittivity may be considered.

The two-variable method disclosed above for calculating a seed value for a minimization algorithm (that as explained in turn is used to calculate the relative permittivity value of the rock in an n=2 system) may also be used directly to calculate the relative permittivity to an acceptable degree of accuracy, as an alternative to the three-variable method described under Permittivity Determination Method Using Three Sensors in Two Layers above. Such a method also lies within the scope of the disclosure hereof and is described in the following section.

D. Use of Two-Variable Method to Determine Relative Permittivity Directly

As mentioned above it has been observed that the two deepest reading sensors of a set of three will produce a result that tends to the relative permittivity of the rock, and the two shallowest reading sensors produce results tending to the relative permittivity of the mud cake.

Based on this knowledge it is possible to employ an approximation to the q-factor allowing the equations to be written in a form that is independent of mud cake thickness. As a result, one of the unknowns is eliminated. This may be viewed as solving for n layers using n sensors if it is considered that the values for the mud cake layer are ignored (not solved for); or one may think of it as solving for n layers using n sensors if one considers that the parameters for the first layer are "lumped together", as outlined.

In more detail the apparent dielectric constant of a two-layer mud cake and rock formation system, as measured by a sensor, can be related to the q-factors of each layer by the equation:

$$\varepsilon_a = \frac{q_m \varepsilon_m + q_r \varepsilon_r}{1 - q_t} \quad (1)$$

The Q-factors are a measure of how much of the sensors' signal response is coming from each of the components in the measurement system. These components are: the tool itself, the mud cake layer and the rock formation. The sum of all q-factors in the system is unity.

$$q_t + q_m + q_r = 1 \quad (2)$$

rearranging gives $$q_r = 1 - q_t - q_m \quad (3)$$

where the subscripts t, m and r denote the tool, mud cake and rock respectively. Generally speaking, $q_t$ will be fixed by the design of the tool and need only be calculated once.

The Q-factor of the mud cake as a function of mud cake thickness h can be thought of as equivalent to the depth of investigation profile of the tool.

It is possible to calculate the correct Q-factor for the mud cake using conformal mapping techniques but this tends to lead to a very complicated mathematical form. So, in order to produce a more tractable result, a suitable simplified form for the Q-factor of the mud cake is adopted.

As a first example, $q_m$ is fitted with an exponential function (other functions may also be suitable)

$$q_m = a[1-\exp(-br)] \quad (4)$$

Where r is a distance measured from the sensor face. In order to proceed further it is necessary to simplify the expression for $q_m$ further by expanding the exponential to first order to give:

$$q_m = abr \quad (5)$$

From equations (1), (3) and (5) we have $$\varepsilon_a = \frac{q_m \varepsilon_m + (1-q_t-q_m)\varepsilon_r}{1-q_t} = \frac{abr(\varepsilon_m-\varepsilon_r) + (1-q_t)\varepsilon_r}{1-q_t} \quad (6)$$

In the example set out above Taylor series expansion is used; but other expansion forms also are potentially applicable.

Solving this equation for the distance r and equating the resulting expressions for two different sensors gives:

$$\frac{\varepsilon_{a1}(1-q_{t1}) - \varepsilon_r(1-q_{t1})}{a_1 b_1(\varepsilon_m-\varepsilon_r)} = \frac{\varepsilon_{a2}(1-q_{t2}) - \varepsilon_r(1-q_{t2})}{a_2 b_2(\varepsilon_m-\varepsilon_r)} \quad (7)$$

where the new subscripts 1 and 2 refer to parameters for the two different sensors. The denominators on both sides contain the term $\varepsilon_m-\varepsilon_r$ which cancel removing the dependence on mud dielectric $\varepsilon_m$. The resulting expression can be rearranged to give the result:

$$\varepsilon_r = \frac{a_2 b_2 \varepsilon_{a1}(q_{t1}-1) - a_1 b_1 \varepsilon_{a2}(q_{t2}-1)}{a_1 b_2 a(q_{t2}-1) - a_2 b_2(q_{t1}-1)} \quad (8)$$

where $\varepsilon_a$ is the apparent (as measured) dielectric constant of each sensor (1 or 2), $q_t$ is the Q-factor of each sensor (1 or 2) and a and b are the parameters of each sensor according to equation (4).

Strictly speaking, this approximation only works when h is much smaller than the depth of investigation of the shallowest reading sensor, and in those circumstances, it could be produced as an answer product in its own right. There are other circumstances when it might be useful as a rough estimation either as an answer product or as a seed value for a numerical solution.

In the foregoing description a and b are fitting parameters for the tool geometric factor (or equivalently the mud cake filling factor). Neither of them has any particular physical meaning in the present context, and any designations of these terms might be somewhat arbitrary.

The method involves first calculating, measuring or otherwise deriving the exact geometric factor $q_m$ for each sensor. Then this geometric factor is fitted with a suitable function. One could choose any of a variety of different types of function but a preferred one in the example given is the exponential association function $q_m=a[1-\exp(-br)]$. It is necessary to fit specifically for each tool.

In this description a could be termed an "amplitude or saturation value" and b a "width" or a "rate constant".

There are many different mathematical forms that could be could be used to fit the tool geometric factor, but general process is the same for all of them:
1) Fit the tool geometric factor with a suitable mathematical function.
2) Using the equation $$\varepsilon_a = \frac{q_m \varepsilon_m + q_r \varepsilon_r}{1-q_t},$$

the equation $q_t+q_m+q_r=1$ and the functions from Step 1 to solve for a third parameter. In most cases the third parameter would be mud cake thickness (but it could equally be mud cake dielectric value or anything else the value of which is not required).
3) Equate the resulting expression for two different sensors. This eliminates the third parameter from Step 2 and gives an expression that has input from two sensors with two unknowns.

At this point, one seeks to solve the problem numerically but the benefit of using the exponential association function is that if it is Taylor series expanded, the term involving mud cake dielectric cancels out. This leaves a single expression for rock dielectric in terms of measured dielectric values from two sensors and two tool parameters. This is easily solved.

It is also possible within the methods described herein to consider two of the variables (i.e. preferably the relative permittivity of the mud cake and the mud cake thickness) as a composite parameter that may be modelled without knowledge of its precise value. Apparatus that is configured to operate in this manner is also within the scope of the disclosure hereof.

It should be noted that the precise modelling and calculation methods may vary from one borehole system to another and in dependence on the properties sought, the foregoing detailed method steps being illustrative merely of techniques that are appropriate for the borehole system and properties investigated in the described embodiment.

In the method steps described herein mathematical notation is used to model physical processes of converting signals output by the sensor elements to a form that is indicative of desired parameter values (that are physical quanta). Following such conversion, the converted signals representative of desired parameters may be transmitted, stored, printed, displayed or further processed.

The disk 43 may be considered as a non-limiting example, within the scope of the disclosure hereof, of a computer-readable medium containing instructions for causing a processing device, such as computer 37 or microprocessor 36, to carry out those steps of the methods described herein that involve modelling, calculation, mapping, simulation, minimization and related steps. Such a medium however may additionally or alternatively take numerous other forms including but not limited to native memory of a computer such as computer 37; native memory of the logging tool 18 (as optionally may be embodied in the microprocessor 36 and/or in separate memory); or in a range of other ways as will occur to the person of skill in the art.

Overall the apparatuses and methods described herein provide significant improvements in the ability of logging tools to provide dielectric constant and other layer property information.

Preferences and options for a given aspect, feature or parameter of the disclosed subject matter should, unless the context indicates otherwise, be regarded as having been disclosed in combination with any and all preferences and options for all other aspects, features and parameters of the embodiments.

The listing or discussion of an apparently prior-published document in this specification should not necessarily be taken as an acknowledgement that the document is part of the state of the art or is common general knowledge.

What is claimed is:

1. An apparatus for use in determining values of properties of a number (n) of borehole layers of a borehole formed in the Earth's crust, the apparatus comprising:
    a plurality of at least (2n-1) sensor members having geometric factors, the geometric factors being mutually differing, known or calculable as defined with reference to a sample under investigation comprising the same number (n) of borehole layers, the sensor members being configured to detect reflected or transmitted electromagnetic energy; and
    one or more supports for supporting the sensor members in the borehole adjacent and/or in contact with one or more of the borehole layers,
    the apparatus being configured to cause transmission of electromagnetic energy along, and/or reflection of electromagnetic energy at, each sensor member in a manner permitting the calculation of values of properties of such layers based on reflected or transmitted energy values detected at the sensor members.

2. The apparatus according to claim 1, including three of the sensor members.

3. The apparatus according to claim 1, including three of the sensor members, wherein a first of the sensor members comprises a first open-ended coaxial reflectometer sensor.

4. The apparatus according to claim 1, including three of the sensor members, wherein a first of the sensor members includes a first open-ended coaxial reflectometer sensor, and wherein a second of the sensor members comprises a second open-ended coaxial reflectometer sensor.

5. The apparatus according to claim 1, including three of the sensor members, wherein a first of the sensor members includes a first open-ended coaxial reflectometer sensor; wherein a second of the sensor members includes a second open-ended coaxial reflectometer sensor; and wherein the second open-ended coaxial reflectometer sensor is larger than the first open-ended coaxial reflectometer sensor, whereby the size of a fringing field of the second open-ended coaxial reflectometer gives rise to investigation more deeply into a material adjacent to the apparatus than the first open-ended coaxial reflectometer sensor.

6. The apparatus according to claim 1, wherein a third of the sensor members includes a coplanar waveguide sensor.

7. The apparatus according to claim 1, wherein a third of the sensor members includes a coplanar waveguide sensor, and wherein the coplanar waveguide sensor and/or each open-ended coaxial reflectometer sensor includes an elongate pad member, wherein a transverse cross-section of the elongate pad member is or includes an ellipse or a part-elliptical shape.

8. The apparatus according to claim 1, including three of the sensor members, wherein a first of the sensor members includes a first open-ended coaxial reflectometer sensor, and wherein the apparatus further includes two coplanar waveguide sensors and one open-ended coaxial reflectometer sensor.

9. The apparatus according to claim 1, wherein the second members include three coaxial reflectometer sensors.

10. The apparatus according to claim 1, including one or more sources of electromagnetic energy operatively connectable electrically to energize the sensor members in radio or microwave frequencies in order to give rise to detectable energy detected at the sensor members.

11. The apparatus according to claim 1, including one or more analysers of detected energy connected to detect values of energy at each of the sensor members.

12. The apparatus according to claim 1, including:
    one or more analyzers of detected energy connected to detect values of energy at each of the sensor members; and
    one or more processing devices configured to derive one or more values of properties of material that is in use adjacent the apparatus, the one or more processing devices being operatively connectable to the one or more analyzers.

13. The apparatus according to claim 1, wherein each of the sensor members includes a sensor surface or a sensor plane.

14. The apparatus according to claim 1, wherein each of the sensor members includes a sensor surface or a sensor plane; and wherein the one or more supports comprises a sensor pad defining a pad surface, each of the sensor members being supported in or by the sensor pad in a manner causing the sensor surface or sensor plane to be at least substantially coterminous with an exterior side of the pad surface.

15. The apparatus according to claim 1, when constituted as or forming part of an elongate, cylindrical logging tool, the sensor members being supported spaced from one another along a line extending along a part of the logging tool.

16. The apparatus according to claim 1, including:
    one or more analyzers of detected energy connected to detect values of energy at each of the sensor members;
    one or more processing devices configured to derive one or more values of properties of material that is in use adjacent the apparatus, the one or more processing devices being operatively connectable to the one or more analyzers; and
    one or more memory devices operatively connected to at least one of the processing devices for storing values of properties calculated by the processing device and/or values of reflected energy detected by the one or more analysers.

17. The apparatus according to claim 1, comprising an elongate, cylindrical logging tool, the sensor members being supported spaced from one another along a line extending along a part of the logging tool, the logging tool being operatively connectable to wireline in order to permit telemetry of values of properties calculated by the processing device and/or values of reflected energy detected by the one or more analyzers from the apparatus to a location remote from the apparatus.

18. The apparatus according to claim 1, including:
    one or more processing devices configured to derive one or more values of properties of material that is in use adjacent the apparatus, the one or more processing devices being operatively connectable to the one or more analyzers;
    an elongate, cylindrical logging tool, the sensor members being supported spaced from one another along a line extending along a part of the logging tool; and
    one or more display devices, printers or plotters operatively connected to one or more said processing device, the one or more processing device and the one or more display devices, printers or plotters being configured to provide a visual indication of values of properties of the n layers.

19. The apparatus according to claim 1, that is configured to cause transmission of electromagnetic energy along, and/or reflection of electromagnetic energy at, each sensor member in a plurality of frequencies.

20. The apparatus according to claim 1, when forming part of or operatively connected to a drillstring.

21. A borehole system including a borehole penetrating the Earth's crust and having received therein apparatus according to claim 1, the apparatus being operatively positioned to detect energy reflected at the sensor members of the apparatus.

22. The borehole system of claim 21 wherein the n layers defined by the borehole and any associated layers are respectively a mud cake layer and a rock layer.

23. The borehole system of claim 22, wherein the mud cake layer and the rock layer are annuli that are substantially coaxial with the borehole.

24. A method of determining values of one or more properties of n layers of a borehole formed in the Earth's crust, the method comprising:
supporting, in the borehole adjacent one or more of the layers, a plurality of at least (2n-1) sensor members having geometric factors, the geometric factors being mutually differing, known or calculable as defined with reference to a system comprising n layers;
causing transmission of electromagnetic energy along, and/or reflection of electromagnetic energy at, each sensor member the sensor members being capable of detecting such transmitted and/or reflected electromagnetic energy; and
calculating values of properties of such layers based on such energy values detected at each sensor member.

25. The method according to claim 24, including activating one or more analysers of transmitted and/or reflected energy connected to detect values of energy detected at each sensor member.

26. The method according to claim 24, including activating one or more analysers of transmitted and/or reflected energy connected to detect values of energy detected at each sensor member and including causing one or more processing devices to derive values of one or more properties of material in use adjacent the apparatus, the one or more processing devices being operatively connectable to each said analyser.

27. The method according to claim 24, including activating one or more analysers of transmitted and/or reflected energy connected to detect values of energy detected at each sensor member and including causing one or more processing devices to derive values of one or more properties of material in use adjacent the apparatus, the one or more processing devices being operatively connectable to each said analyser, wherein the one or more processing devices in operation models one or more said sensor according to a conformal mapping technique.

28. The method according to claim 24, including:
activating one or more analysers of transmitted and/or reflected energy connected to detect values of energy detected at each sensor member; and
causing one or more processing devices to derive values of one or more properties of material in use adjacent the apparatus, the one or more processing devices being operatively connectable to each said analyser;
wherein the one or more processing devices in operation models one or more said sensor according to a conformal mapping technique; and
wherein the conformal mapping technique maps a non-flat sensor surface or sensor plane adjacent or in contact with a substantially annular first layer that is contiguous with a substantially annular second layer as a series of three flat layers.

29. The method according to claim 24, wherein the properties the values of which are determined include one or more of the dielectric constant or permittivity of the respective n layers; the thickness of at least one said layer; and the electrical conductivities of the layers.

30. The method according to claim 24, including effecting deployment of apparatus according to claim 1 in a borehole having n layers and operating the apparatus to derive values of properties of the n layers.

31. The method according to claim 24, including effecting deployment of apparatus according to claim 1 in a borehole having n layers, operating the apparatus to derive values of properties of the n layers and including withdrawing the apparatus along the borehole.

32. The method according to claim 24, including effecting deployment of apparatus according to claim 1 in a borehole having n layers and operating the apparatus to derive values of properties of the n layers.

33. The method according to claim 24, including effecting deployment of apparatus according to claim 1 in a borehole having n layers and operating the apparatus to derive values of properties of the n layers.

34. The method according to claim 24, including causing transmission of electromagnetic energy along, and/or reflection of electromagnetic energy at, each sensor member in a plurality of frequencies.

35. The method according claim 24, when carried out as part of a logging-while-drilling (LWD) operation.

36. A method of determining the value of a parameter of a borehole system comprising a borehole having supported therein, apparatus comprising two sensors that are capable of generating outputs indicative respectively of differing mixtures of values of a first parameter of the borehole system and a further parameter of the borehole system, the first parameter being representative of a single physical characteristic of the borehole system and the further parameter taking account of up to two further physical characteristics of the borehole system, the method including:
causing transmission of electromagnetic energy along, and/or reflection of electromagnetic energy at, each sensor member the sensor members being capable of detecting such transmitted and/or reflected electromagnetic energy;
operatively connecting the sensors to processing apparatus; and
using the processing apparatus to convert the sensor outputs to a value of the first parameter that is compensated for the further parameter.

* * * * *